SIGNAL PROCESSING UTILIZING MAGNETIC BODY WHOSE PROPERTIES ARE INFLUENCED BY LIGHT WAVES

Filed Dec. 26, 1968

INVENTOR.
NIGEL J. FREEDMAN
BY Frank R. Trifari
AGENT

United States Patent Office 3,535,660

Patented Oct. 20, 1970

3,535,660

SIGNAL PROCESSING UTILIZING MAGNETIC BODY WHOSE PROPERTIES ARE INFLUENCED BY LIGHT WAVES

Nigel John Freedman, Brighton, Sussex, England, assignor to U.S. Philips Corporation Filed Dec. 26, 1968, Ser. No. 787,035
Claims priority, application Great Britain, Dec. 28, 1967, 58,843/67
Int. Cl. H03h 7/30
U.S. Cl. 333—30 6 Claims

ABSTRACT OF THE DISCLOSURE

Signal processing by means of magnetic bodies such as mono-crystalline yttrium iron garnet (YIG), capable of converting electromagnetic wave energy into slower travelling waves and vice versa, and whose magnetic properties are influenced by light waves. Such bodies can be used in delay lines.

This invention relates to signal processing by means of magnetic bodies capable of converting electromagnetic (E.M.) wave energy into slower travelling waves and vice versa.

One material for such bodies is mono-crystalline yttrium iron garnet (YIG), which can convert an E.M. wave into a spin wave (which propagates by electron spin disturbances in ferrimagnetic materials), and can then magnetostrictively convert the spin wave into an elastic (i.e., acoustic) wave; both conversions are reversible. Spin and elastic waves travel more slowly than E.M. ones, and so such bodies can be used in delay lines. An example of such use is described in the specification of British patent application 15,310/67.

More specifically this invention relates to signal processing by means of magnetic bodies whose magnetic properties are influenced by light waves ("light" including invisible radiations such as X-rays or the infrared range). The influence may continue long after the light wave irradiation ceases, thus providing a memory. This class of magnetic body, and some ways in which the magnetic property changes can be observed, comprise the subject of U.S. patent application Ser. No. 756,999, filed Sept. 3, 1968. One such body is a single crystal of a material derived from YIG by substituting silicon for a small proportion of the iron ions. The range of wavelengths of light to which the magnetic properties respond should of course overlap a range over which it is at least to some extent transparent. Doping the temperature affect both these qualities. In such materials the effective anisotrophy field is determined by the total incident "light," a summation or integration effect perhaps over a considerable time.

Features and advantages of the invention will appear from the following description of embodiments thereof, given by way of example, in conjunction with the accompanying drawing, in which.

Figure 1:
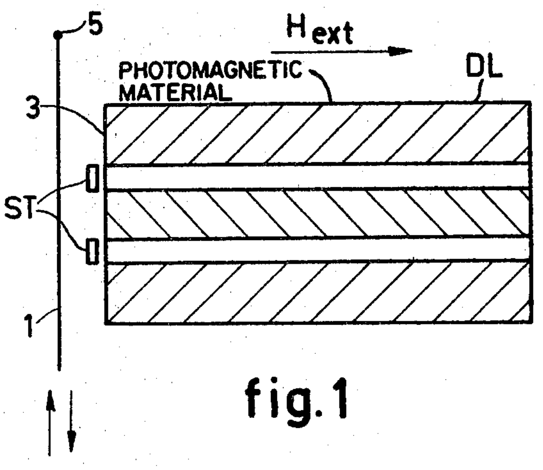
FIGS. 1 and 2 show plan and end-on view of a rectangular slab of photomagnetic material and, not at all to scale, optical and microwave signal arrangements adjacent the slab.
Figure 2:
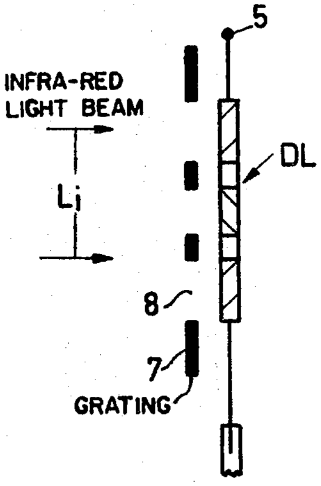

Referring to FIGS. 1 and 2, a rectangular but very thin single crystal body DL of a photo-magnetic material (e.g., YIG with some of its iron replaced by silicon) is used to delay microwaves entering its left-hand edge face 3 as viewed in FIG. 1 from an aerial perhaps terminated at 5.

Aerial 1 may be an extension of a coaxial cable inner, or other arrangement whereby the end region of the crystal body is in a microwave magnetic field.

Body DL has one of its broad faces illuminated by an infra red light beam, preferably previously focussed parallel, as symbolized by the arrows L*i* in FIG. 2, the beam passing through a grating 7 having three slots 8 parallel to the length of body DL.

There are thus illuminated three longitudinal regions, shown hatched in FIG. 1, over the width of the body, and they are separated by nonilluminated portions, shown unhatched, which may serve a useful purpose referred to again later.

Since the body is thin, the illumination will penetrate effectively through even if the material is not very transparent at the operating wavelength, which must be able to cause magnetic changes in the body quantitatively dependent on the degree and duration of illumination.

The three window slots 8 have different transmissivities and hence the three hatched regions in FIG. 1 are differently irradiated.

A uniform magnetic field externally of the body $H_{ext}$ is set up by means not shown and, due to the differential irradiation of body DL, three different longitudinal internal effective magnetic fields are set up within DL.

The field $H_{int}$ along any one rises steadily from each end of the body symmetrically to a peak in the centre. The three regions will have three different distributions generally of the same form as shown qualitatively by FIG. 3 which shows only the left hand halves of the symmetrical curves.

The delay mechanism for any one of the three slab strips of DL is that a microwave pulse from aerial 1 enters the body via 3, then is (indirectly) converted to an elastic wave by magnetostriction at a given value of the internal magnetic field $H_{int}$. The elastic wave travels leftward, internally reflects from face 3, which is ground and polished for the purposes, returns to where the internal field has the same given value, whereat it reconverts to an electromagnetic wave. This afterwards can be picked up by aerial 1, may be then distinguished from the incident wave by virtue of its opposite direction of travel by means not shown.

Since elastic waves travel relatively slowly, delay occurs, and the delay obviously is determined by the distance the elastic wave covers over its return journey. Since there is a given $H_{int}$ value H at which the conversion occurs, relatively long delays will arise when the given value $H_T$ occurs as far rightwards, towards the centre, as possible in the body.

Figure 3:
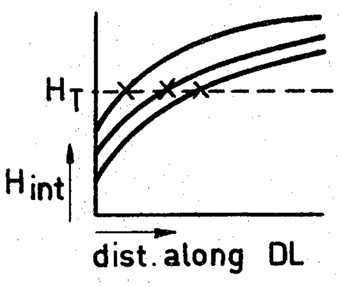
FIG. 3 shows a graph of internal magnetic field within the slab (assuming a uniform external field) for three different paths for the microwave signals, plotted against distance along the slab, and the intersection of the three curves by the turning point field abscissa, the left hand half only being visible.

Thus the shortest delay time for the three microwave signal elements will be experienced by that element which follows the path along which the internal field distribution $H_{int}$ follows the top curve in FIG. 3, while the longest will correspond to the bottom curve, which is intercepted by abscissa $H_T$ nearest the centre of DL.

The three reconstituted signals, returning leftward to aerial 1 will arrive thereat at three different times. If the input signal was a short pulse, the output will be three separate pulses.

FIG. 1 shows unhatched portions separating the three hatched ones, these are assumed to be unilluminated due to the grating material between windows 8.

It may be preferable not to use this material, in case the magnetic effect is not quite as sharp or localized as the irradiation areas. Thus stops ST may be used, or some such artifice employed to prevent delay waves following the unhatched paths of body DL. Stops ST are metal or other coatings and prevent internal reflections of acoustic waves by face 3.

Especially this may be necessary when using the memory effect of photomagnetic materials. Many retain the magnetic change long after illumination ceases, but the magnetic regions may gradually lose their sharp boundaries with time. Blanking off intermediate regions by stops enable longer periods after illumination the memory effect to be relied upon for differentially delaying signal components.

A discussion of the output signal will follow below with reference to FIG. 4.

Only three photomagnetic divisions are shown, but a very large number may be employed, the sharpness of definition obtainable sometimes limits the number of parallel paths, however, to quite a small number.

When the "memory" effect is to be used, the three regions may of course be illuminated at different times, perhaps by moving one slit to successive positions, using three differently powered light sources in turn. The regions could be tested separately, "charging" them up by a little more illumination until the desired degree of photoeffect is obtained.

Figure 4:
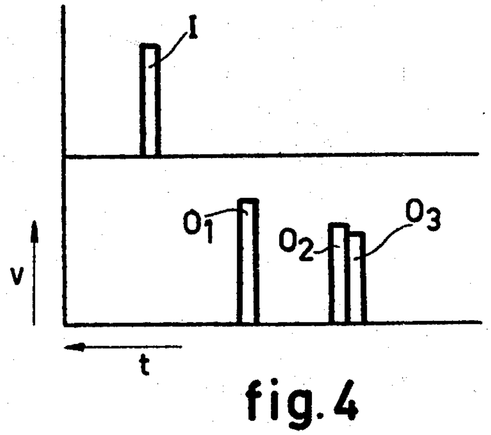
FIG. 4 shows graphs on the same time scale of input and output (microwave) pulses in the FIG. 4 arrangement.

Due to the three-way splitting of the input pulse, a three part output pulse occurs, the three parts occurring at different times, as illustrated in FIG. 4. In this figure, the input pulse form I can be seen on the same time scale as the three component output pulses $O_1$, $O_2$, $O_3$ appearing at aerial 1. The time differential pattern of the latter provide a code which can be identified as that resulting from a pulse delayed by body DL as illuminated via grating 7.

By such coding it is feasible to improve by subsequent processing, for example correlation techniques, the detectability of the signal in the presence of unwanted signals or clutter.

Since the efficiency of the conversion processes between E.M. and elastic waves depends on the slope of the particular internal field/longitudinal position curve (FIG. 3 type), the differential illumination of body DL provides that output pulses O have different magnitudes. These differences in any case arise due to differential losses for the three paths.

The various output components may "touch" (e.g., $O_2$ and $O_3$) or there may be time intervals between th em (like $O_1$ and $O_2$). In general, the greater the delay time the lower the amplitude of an individual output component.

When the identification code is defined by both a time differential and an amplitude pattern, as is possible by the arrangement of FIG. 1, more selectivity or security may be offered. The output pulse pattern indeed resembles the projections on a key, and can fulfill a somewhat analogous function, in unlocking input paths to receivers and the like.

Since the delay body will "remember" the impressed light distribution for some time after irradiation ceases, the internal effective field pattern often remaining sharply and discontinuously defined in the one body, the identification code can similarly be impressed on output pulses for some time, e.g., hours, after the light control source is switched off. Indeed it may be necessary with some such photomagnetic materials to illuminate perhaps for a short time only, and switch off before any coded signals are to be sent, because the magnetization may slowly increase all the while the body is being irradiated.

There will usually be many more than three illuminated regions in one single crystal body, and they may touch, but three spatially separate ones are shown for convenience.

Instead of the side-on illumination of FIG. 1, end-on illumination will be more convenient in some cases, giving a lessening intensity of illumination pattern within the body, but this will generally be less desirable.

Figure 6:
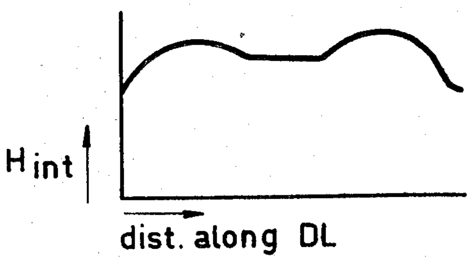
FIG. 6 shows a typical graph of magnetization against distance along a ferrite body such as that of FIG. 1.

A further benefit of the above invention is providing the double hump internal field curve of FIG. 6, to give two-port operation rather than single-port or reflective modes.

Provious proposals for forming of the curve have been made by using irregularly shaped single crystal delay bodies, or doing the equivalent by "loading" a regularly shaped crystal with surrounding pieces of some other magnetic material. This alters the response in internal field $H_{int}$ to a given external field $H_{ext}$.

A simple alternative, according to the invention, is to illuminate a body selectively along it by a light source to provide the same shaping of the internal magnetic field as is illustrated in FIG. 6.

This second example of the invention may be useful with any photomagnetic body to facilitate its operation as a two-port delay line, whether for temporally splitting input pulses or not.

Figure 5:
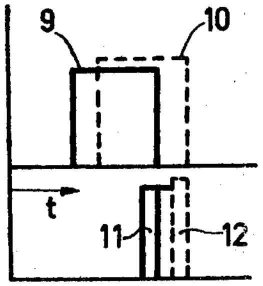
FIG. 5 shows another pair of input and output pulse waveforms, obtained by a rather different mode of signal processing, but from a similar arrangement to that of FIG. 1.

A third example of the applicability of this invention is illustrated by the pulse waveforms of FIG. 5.

As before a body, able under magnetic bias to convert E.M. waves through spin waves to acoustic waves and back again, responsive in its magnetic properties to infrared light entry, and whose delaying powers depend on its internal magnetic field, is used.

In this case, however, the property used is that the carrier frequency dispersive powers of E.M. signals delayed by the above mechanism are themselves dependent on the internal effective field/longitudinal distance function (by "longitudinal" is meant "along the signal path" which will often be the geometrical longest dimension of the body).

According to this embodiment of the invention, the photomagnetic body is selectively illuminated along its (path) length with a pattern which converts the delay time/frequency relationship, which would occur in the absence of irradiation (typically an approximate inverted U), into a linear or other desired relationship over certain portions of the body. The required pattern can be calculated according to the various constants of the specific system, or can be arrived at by successive experimentation, approaching the ideal linear or other relationship in steps.

With this embodiment, pulse compression is the desired achievement, where the input pulse is rectangular in form with a frequency varying linearly with time between the vertical leading and trailing edges of the pulse. The embodiment provides almost linearly varying delay with frequency so that the output pulse may be several 100 times shorter in duration, albeit containing the same information.

Referring now particularly to FIG. 5, there are shown wave forms of two overlapping $1\mu$ sec. pulses, 9, 10, the latter in dashed lines.

The pulses are each of the same type in that the carrier frequency varies linearly throughout their duration, a type often used in radar altimeters and the like, and this frequency modulation is used to aid in resolving them in spite of their ¾ or so overlap.

A delay body of the photomagnetic type is arranged generally similarly to that in FIG. 1, except that the illumination will vary along the length of the body instead of over its width as in FIG. 1.

The delay/frequency characteristic is preferably linear, and this involves bringing about a particular internal magnetic field/longitudinal distance characteristic which in turn involves, according to the invention, illuminating the body with light, at a wavelength which will activate the photomagnetic material and to which the material is transparent, having set an external field $H_{ext}$ according to a calculated or experimentally derived illumination/longitudinal distance characteristic.

As a result of the early parts of the FM pulses being delayed more than the later parts, the resulting pulses are much shorter in duration, as depicted below in FIG. 5 by the now quite separated output pulses 11, 12.

On the contrary, it might be desired to lengthen a FM pulse such as 9 and this can be accomplished by producing a delay/frequency characteristic linear in the opposite sense.

In either case, there is often a change in attenuation with delay time, so that some amplitude compensation, equalization, or weighting may be necessary.

These simple techniques for pulse compression or stretching according to the invention are expected to be widely applicable in such fields as high definition radio location, or radar.

A fourth application of the invention is to use the photomagnetic effect to influence the conversion points, i.e., the turning and crossover points. Thus one can limit the spatial travel of a spin wave before it reaches the crossover field value (by provision of a high gradient). Also, although these two points are frequently very close together (hundredths of a millimetre), their field gradients may be adjusted separately by suitable spatially varying illumination.

A fifth type of embodiment of the invention is really a variation on the fourth, and can be applied for providing an otherwise uniform field with a localized gradient for the purposes subsequently described.

The flat portion will be wanted in this embodiment for parametric amplification of the microwave carrier or other interaction process, since a uniform field is most favourable for this operation.

One may produce a uniform $H_{int}$ first, and then add the nonuniformity optically.

Thus spin waves can be launched in a desirable field gradient, then directed to a uniform field for parametric amplification, etc.

Another application of the invention is differentially illuminating a photomagnetic delay body to bring about a measure of focussing of the travelling spin waves, i.e., the wave fronts are made somewhat convergent or are prevented from becoming divergent, which otherwise happens sometimes.

It may be that the above focussing can be achieved at the same time as the photomagnetically caused concavity in FIG. 5 is set up for 2-port delay line operation.

It is sometimes difficult to carry out these two objects simultaneously by loading a YIG body with further polycrystalline YIG pieces.

It will usually be found necessary or advisable to experiment before the ideal light irradiation patterns are achieved, even if calculations are made beforehand.

It has been found that silicon-doped YIG has more magnetic losses than has pure YIG, so this has to be allowed for in design.

Some attempts to cause or improve photo-magnetic operation by doping introduce concomitant reduction or even cancellation of magnetostrictive action, but further dopants can then often be found to compensate somewhat for the latter disadvantage.

Instead of illuminating with infrared control beams, control waves of X-ray frequencies are found also to provide a degree of internal magnetic field shaping so that the wavelengths of the control beams can vary considerably. Unfortunately X-rays are very difficult to control as regards impingement area, which sometimes precludes their use.

Sometimes that the photomagnetic activation is far more efficient when the body is maintained cool, perhaps to cryogenic temperatures of the order of 20° K., depending on the degree of doping of the material.

Another application of the invention is to influence the Faraday effect differentially in a single monocrystalline body. A single incident signal infrared beam of plane polarized light travelling through the body over a plurality of parallel paths which are differentially illuminated by the same sort of infrared light, e.g., in the manner shown in FIG. 1, will be split up into component beams, all of which have been rotated in polarization plane by different amounts.

The wavelength of the control beam must be such as to enter the body, and having entered to cause internal magnetic field changes, whereas the wavelength of the signal beam need only to be able to pass through the body in sensible amounts.

Thus it can be seen that the above arrangements according to the invention provide:

(1) Signal processer, especially for microwave carrier waves, using a magnetic delay body able to convert electromagnetic waves to slower waves and back, and able to alter its magnetic properties when irradiated by "light" (preferably retaining the alteration some time after cessation of radiation), comprising means to introduce and couple out the carrier wave to and from the body, and means to activatingly illuminate the body with "light" nonuniformly over its volume, either over its length or over its width, or both.

(2) Signal processing by means of a body defined in paragraph 1 which is being illuminated, or has been illuminated by "light" to which the body is transparent and photomagnetically active.

(3) Signal processing or processer following paragraph 1 or 2 applied to any of: pulse compression or stretching, magnetoelastic delay device modification, bringing about a concave field/longitudinal distance characterictic for 2-port delay operation, impressing and identification code to an input pulse by splitting, and differentially delaying the split components along separate paths, focusing or preventing defocusing of a signal undergoing delay in the body, or influencing wave conversion efficiencies in the body.

(4) Signal processing or processer following the general lines of paragraph 1, 2 or 3 in which the illumination brings about, as appropriate, alterations in magnetic field amplitude distribution, gradient or direction within a photomagnetic delay body.

(5) Alteration by impressed "light" of Faraday rotation, phase shift or attenuation properties in regions of a single photomagnetic body for the purposes of creating different partial microwave or optical waves for subsequent processing or recombination.

What is claimed is:

1. A signal processing arrangement comprising a body able to convert electromagnetic waves to slower travelling waves by virtue of a magneto-transducive property involving application of a magnetic bias, and able to respond magnetically to irradiations, comprising means for terminating an input signal line and so mounted in juxtaposition with said body that a version of a signal on said input line is launched within the body, means to magnetically bias the body, an output means mounted with respect to the body such that electromagnetic waves reconstituted from a slow wave version of the input signal are picked up by said output means for delivering to an output transmission line, and a source of irradiations of intensity non-uniform in at least one parameter of the parameters time and space, the nonuniformity constituting a control signal, and oriented to radiate toward the body, whereby signals transmitted through said body are processed according to the control signal.

2. An arrangement according to claim 1 comprising means for irradiating spatially nonuniformly, and irradiating different areas of said body at different times, thereby relying on the memory capacity of the irradiation and magnetization properties of the body.

3. An arrangement according to claim 2 further comprising means for generating an identification code train of output pulses or irregular temporal spacing in response to a smaller number of input pulses.

4. An arrangement according to claim 1 further compriing means for differentially illuminating the body along the path between the input and output means whereby the required two-port operation is favoured.

5. An arrangement according to claim 1 further comprising means for illuminating the body in regions bounded generally parallel to the input/output means path, irradiation being uniform over a region.

6. An arrangement according to claim 1 further comprising means for differentially irradiating the body along its input/output means line such that the dispersive characteristic of delay effect given by the reversible transducing into slow waves is linearized, means for feeding in at the input means a frequency modulated pulse, and means for obtaining from the output means a compression pulse of shorter duration.

References Cited

UNITED STATES PATENTS

| | | | |
|---|---|---|---|
| 3,353,118 | 11/1967 | Olson et al. | 328—58 X |
| 3,412,269 | 11/1968 | Crittenden | 333—30 X |
| 3,432,670 | 3/1969 | Dym | 307—311 X |

PAUL L. GENSLER, Primary Examiner

U.S. Cl. X.R.

328—58; 333—70